(12) United States Patent
Chen et al.

(10) Patent No.: US 6,560,321 B1
(45) Date of Patent: May 6, 2003

(54) METHOD AND APPARATUS FOR QUICK STARTUP IN A HALF-DUPLEX MODEM SYSTEM

(75) Inventors: Li Chen, Stanford, CA (US); Keith Chu, Laguna Niguel, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/405,581

(22) Filed: Sep. 27, 1999

(51) Int. Cl.[7] ............................................. H04M 11/00
(52) U.S. Cl. ............................ 379/100.17; 379/100.01; 370/292; 375/222
(58) Field of Search ...................... 379/100.01, 100.17, 379/90.01, 93.05, 93.06, 93.07, 93.08, 93.09; 370/252, 292; 375/222, 377

(56) References Cited

U.S. PATENT DOCUMENTS

| | | | | |
|---|---|---|---|---|
| 4,953,210 A | * | 8/1990 | McGlynn ..................... | 375/222 |
| 5,353,280 A | * | 10/1994 | Ungerbock .................. | 370/252 |
| 5,847,842 A | * | 12/1998 | Maeda ....................... | 358/434 |
| 6,163,570 A | * | 12/2000 | Olafsson ..................... | 375/222 |
| 6,266,348 B1 | * | 7/2001 | Gross et al. ................. | 370/252 |
| 6,426,946 B1 | * | 7/2002 | Takagi et al. ............... | 370/252 |

\* cited by examiner

*Primary Examiner*—Melur Ramakrishnaiah
(74) *Attorney, Agent, or Firm*—Farjami & Farjami LLP (57) ABSTRACT

A half-duplex facsimile modem system according to the present invention may exhibit a shorter startup time relative to conventional systems. The modem system exchanges capabilities information concurrently with the transmission of a conventional answer signal, thus obviating the need for performing a separate capabilities exchange procedure. In addition, the modem system is capable of determining a preferred training sequence duration based upon one or more characteristics of the current channel. The preferred training sequence duration is communicated from the answer modem to the calling modem such that the calling modem can format the training sequence in an appropriate manner. The resultant training sequence has a time duration that is variable in response to, e.g., the signal-to-noise ratio of the instant channel. These techniques can result in a significant reduction in the startup latency typically associated with conventional half-duplex facsimile modem systems.

57 Claims, 3 Drawing Sheets

METHOD AND APPARATUS FOR QUICK STARTUP IN A HALF-DUPLEX MODEM SYSTEM

FIELD OF THE INVENTION

The present invention relates generally to modem systems. More particularly, the present invention relates to the initialization of a half-duplex facsimile modem system.

BACKGROUND OF THE INVENTION

The prior art is replete with different types of full-duplex, half-duplex, data, and facsimile modem systems. Many conventional modem systems that communicate over the public switched telephone network ("PSTN") may have an undesirably long connect or initialization time between dial-up and the full rate data mode. In the context of a typical half-duplex facsimile modem connection, the startup time can be up to 12 seconds, which can be rather annoying and inefficient, especially in light of some alternative data communication protocols that take advantage of higher transmission speeds.

The initialization of V.34 (and V.90) modem systems begins with the well known startup procedure set forth in ITU-T Recommendation V.8 (International Telecommunication Union, February 1998). In the context of a V.34 system, the V.8 procedure is performed during Phase 1 of the V.34 initialization routine. The modem devices perform the V.8 procedure to exchange their functional capabilities, e.g., the different operating protocols that are respectively supported by each modem device. In a practical operating environment, up to 3.5 seconds of the overall startup time may be devoted to the completion of the V.8 procedure.

Conventional half-duplex facsimile modem systems may perform the V.8 routine in the same manner as a full-duplex system. However, in a half-duplex facsimile modem system, portions of the full-duplex V.8 procedure may be redundant or unnecessary. Consequently, the length of the V.8 phase associated with the startup of a half-duplex facsimile connection may be much longer than actually required.

A V.34 modem system performs Phase 3 of the initialization routine to adaptively train certain functional components, e.g., the equalizer structure, of the receiving device. The equalizer structure is trained in response to a training sequence that has a fixed length or duration designed for the particular implementation. In conventional systems, the predetermined training sequence length is based on experimental test results. The training sequence length is typically dictated by the answering device, which may communicate the length back to the calling device during the initialization period. In a typical system, the transmission and processing of the training sequence may take up to 4.0 seconds. Although the use of a long training sequence increases the likelihood that the equalizer structure will be effectively trained, the overall startup time also increases in a proportional manner. Consequently, prior art systems do not utilize a training sequence having variable characteristics that result in an optimized convergence or a quick, robust, and efficient convergence.

In view of the increasing demand for quick modem startup times, an improved half-duplex facsimile modem initialization routine having a reduced startup latency would be desirable. However, a modified initialization protocol should include an escape route such that the modem system can remain compatible with traditional startup protocols if the modified protocol is not supported by both modem devices.

BRIEF SUMMARY OF THE INVENTION

The present invention provides techniques to shorten the startup time associated with a data communication system that employs a half-duplex modem device. The quick startup technique communicates capabilities exchange information concurrently with the transmission of an analog answer tone associated with the establishment of a call. This feature obviates the need to perform a conventional V.8 procedure and effectively reduces the startup time for the given communication session. The quick startup technique may also employ a training sequence having a variable length (or time duration) that is selected based upon the present characteristics of the communication channel. The duration of the training sequence may be suitably selected to strike a balance between the startup time and the effectiveness of the training procedure. In a preferred embodiment, the techniques of the present invention may be implemented in a manner that is compatible with conventional initialization routines. Accordingly, if the two modem devices support the procedures described herein, then the system may be initialized in a quick manner. On the other hand, if the two modem devices are not fully compatible with the techniques of the present invention, then the system is capable of escaping to a conventional startup routine.

The above and other aspects of the present invention may be carried out in one form by a method for reducing startup latency associated with a data transmission system having a calling device configured to communicate with an answer device over a communication channel. One illustrative method involves the establishment of a call between the calling device and the answer device, the transmission of an answer signal from the answer device to the calling device, and the sending of a capabilities exchange signal from the answer device to the calling device, where the answer signal and the capabilities exchange signal are transmitted in a concurrent manner.

BRIEF DESCRIPTION OF THE DRAWINGS

A more complete understanding of the present invention may be derived by referring to the detailed description and claims when considered in connection with the following illustrative Figures, wherein like reference numbers refer to similar elements throughout the Figures and:

DETAILED DESCRIPTION OF A PREFERRED EMBODIMENT

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in conjunction with any number of data transmission protocols and that the modem system described herein is merely one exemplary application for the invention. Further, it should be noted that the present invention may employ any number of conventional techniques for data transmission, signaling, data processing, network control, and the like. Such general techniques that may be known to those skilled in the art are not described in detail herein.

The particular implementations shown and described herein are illustrative of the invention and its best mode and are not intended to otherwise limit the scope of the present invention in any way. Indeed, for the sake of brevity, conventional signal processing, data transmission, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
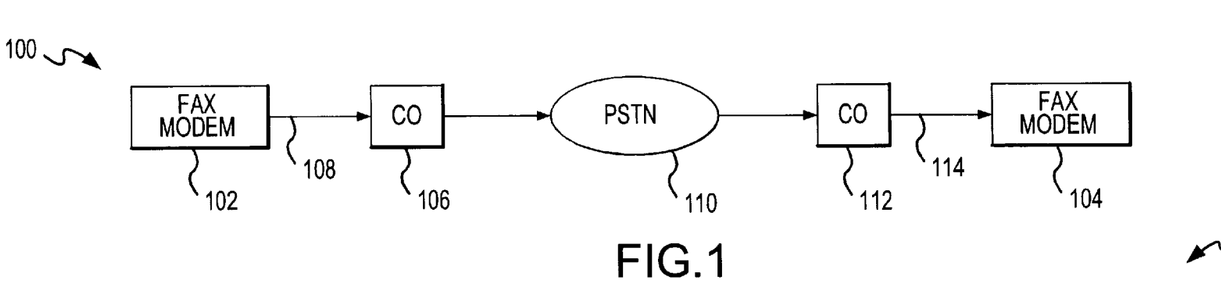
FIG. 1 is a block diagram depicting a general facsimile modem environment capable of supporting the techniques of the present invention.

FIG. 1 is a block diagram depicting a general facsimile ("fax") modem system 100 capable of supporting the techniques of the present invention. For purposes of this description, system 100 is assumed to be compatible with ITU-T Recommendation V.34 (International Telecommunication Union, September 1994) and with ITU-T Recommendation T.30 (International Telecommunication Union, July 1997). Recommendation V.34 sets forth an operating protocol for an analog modem system that communicates over a general switched telephone network, while Recommendation T.30 sets forth an operating protocol for facsimile transmissions over a general switched telephone network. The contents of Recommendation V.34, Recommendation T.30, and any associated amendments and supplements, are incorporated herein by reference.

Modem system 100 includes a first fax modem device 102 configured to communicate fax data to a second fax modem device 104. Modem system 100 may operate in a half-duplex mode such that fax data is transmitted in one direction, e.g., from fax modem device 102 to fax modem device 104. In accordance with conventional half-duplex transmission techniques, fax modem device 104 may also transmit information, control, supervisory, or other signals to fax modem device 102 during the communication session. The general operation of fax modem devices and the associated fax reproduction mechanisms (e.g., fax machines, fax software applications, and the like) are well known to those skilled in the art.

In a preferred embodiment, fax modem devices 102 and 104 are each capable of operating as a V.34 fax modem. Although the present invention is described herein in the context of a V.34 half-duplex fax modem system, the techniques of the present invention may be equivalently practiced in any number of modem system applications. As shown in FIG. 1, fax modem device 102 transmits signals to a first central office 106 via an analog local loop 108. Thereafter, the signals are routed through a suitable network, e.g., the public switched telephone network ("PSTN") 110. The signals are eventually sent to a second central office 112 and, in turn, to second fax modem device 104 via a second analog local loop 114.

As discussed above, the startup time associated with a conventional V.34 half-duplex fax modem system may be undesirably long. The present invention may be utilized to reduce the normal startup time of such a system by a significant amount. Briefly, second modem device 104, which is the answer modem in modem system 100, recognizes that an incoming call is a fax call (in accordance with known procedures set forth in the T.30 Recommendation). In response to a fax call, second modem device 104 transmits an answer tone combined with a fast connect identifier signal. In a preferred embodiment, the fast connect identifier signal also conveys information related to the capabilities of second modem device 104. Modem system 100 may also be configured to generate a training sequence having a duration that is variable in response to a characteristic of the communication channel established between first and second fax modem devices 102 and 104.

Figure 2:
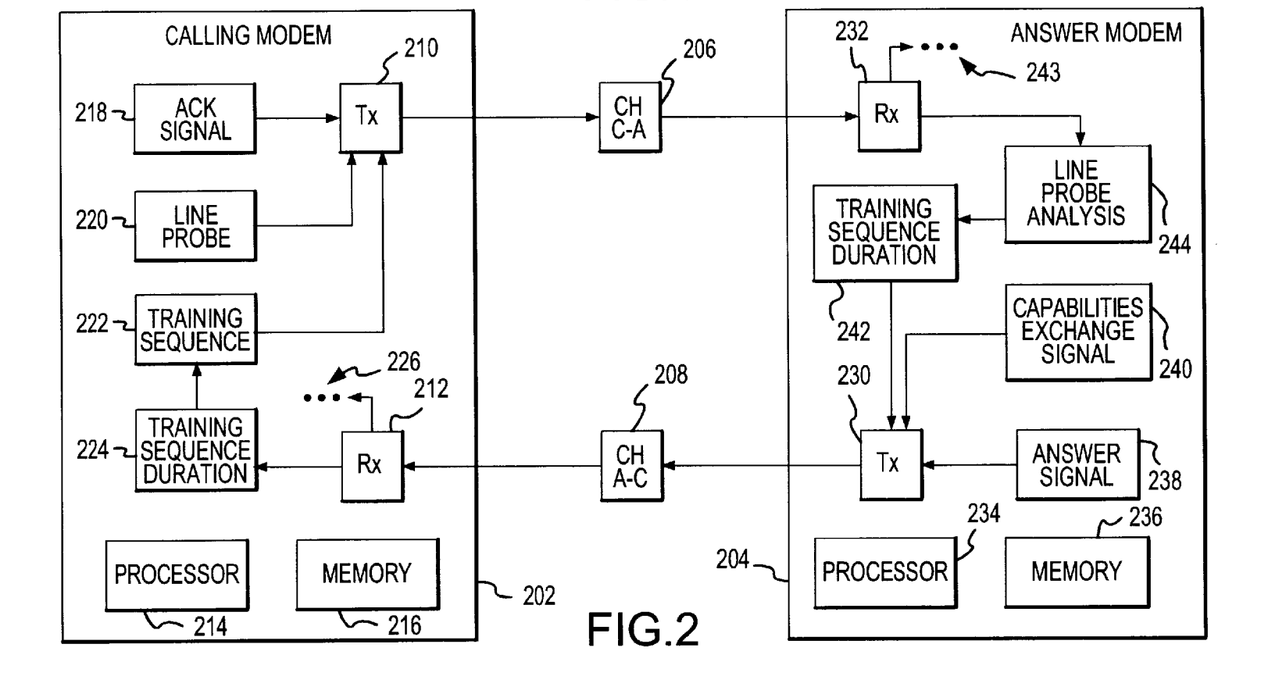
FIG. 2 is a block diagram depicting an illustrative facsimile modem system that may be utilized in the context of the present invention.

FIG. 2 is a block diagram depicting an illustrative facsimile modem system 200 that may be utilized in the context of the present invention. Modem system 200 is preferably configured to carry out a number of conventional data communication processes along with the various processes described herein. By way of example, modem system 200 may be capable of operating in a V.34 half-duplex facsimile mode. However, it should be appreciated that the particular implementation shown in FIG. 2 and described herein is not intended to limit the scope of the present invention in any way.

Generally, modem system 200 includes a first modem, e.g., modem 202, and a second modem, e.g., modem 204. In the context of this description, modem 202 is considered to be a calling modem and modem 204 is considered to be an answering modem. It should be appreciated that modems 202 and 204 may be similarly configured such that each can function in both a transmit mode and a receive mode. Modems 202 and 204 are generally configured in accordance with known principles to communicate over a telecommunication network, such as the PSTN, via at least one communication channel (e.g., channels 206 and 208). For the sake of clarity, FIG. 2 does not show the various encoder, decoder, and other detailed functional elements that would typically be present in a practical modem system.

Modem 202 generally includes a transmitter section 210, a receiver section 212, a processor element 214, and a memory element 216. In addition to the specific operations described herein, processor element 214 is suitably configured to carry out various tasks associated with the operation of modem system 200. Indeed, modem system 200 may incorporate any number of processors and/or control elements as necessary to support its functionality. Such processor and control elements may suitably interact with other functional components of modems 202 and 204 to thereby access and manipulate data or monitor and regulate the operation of modem system 200.

Processor element 214 may be operationally associated with transmitter section 210, receiver section 212, memory element 216, and other components or elements of modem 202. For the sake of clarity, FIG. 2 does not show connecting lines associated with processor element 214 or memory element 216; in a practical embodiment, processor element 214 and memory element 216 may be physically coupled and/or functionally associated with any number of elements resident at modem 202. Processor element 214 may be realized by a suitable digital signal processing component that is configured to operate in conjunction with other elements of modem 202, and/or in conjunction with suitable software instructions, to carry out the various processing tasks described herein.

Transmitter section 210 is capable of transmitting encoded symbols in accordance with conventional data transmission techniques. Such symbols may represent data, training sequences, synchronization signals, control signals, information exchange sequences, and any suitable communication signal utilized by modem system 200. Modem 202 is preferably configured to generate, process, and transmit different data and signals associated with the operation of modem system 200. Such data, signals, and sequences may be suitably stored, formatted, and produced by any number of microprocessor-controlled components. For illustrative purposes, FIG. 2 depicts a number of blocks related to different data, signals, or sequences that may be transmitted by transmitter section 210 during the operation of modem system 200. Although a practical system may process and transmit any amount of additional or alternative data, the particular embodiment described herein functions in cooperation with at least the following signals or sequences: an acknowledgment signal 218, a line probing signal 220, and a training sequence 222. These signals and sequences, and the handling thereof by modem system 200, are described in detail below.

Modem 202 also includes receiver section 212, which may be configured in accordance with any number of known modem technologies. Receiver section 212 is configured to receive communication signals from modem 204; such signals may include encoded information bits, control signals, information exchange sequences, training sequences, and the like. Receiver 214 may be capable of receiving data (from modem 204) that conveys a training sequence duration 224 (an alternate embodiment may employ a training sequence length, e.g., a symbol length, rather than a time duration). As depicted in FIG. 2, the training sequence duration data 224 may be utilized by modem 202 to format training sequence 222. Receiver section 212 may generate any number of additional outputs 226, e.g., control signals, information signals, or data signals, as required during the operation of modem system 200.

Modem 202 also includes (or is operatively associated with) a suitable amount of memory 216 necessary to support its operation. Memory element 216 may be a random access memory, a read only memory, or a combination thereof. Memory element 216 may be configured to store information utilized by modem system 200 in connection with one or more processes related to the present invention, as described in more detail below. Modem system 200 may employ any number of conventional memory elements; the fundamental operation of such memory elements, which are generally well known in the art, will not be described in detail herein.

Modem 204 may be generally configured in a similar manner as modem 202. Accordingly, the generalized description of the components employed by modem 202 may be equivalently applied in the context of a transmitter section 230, a receiver section 232, a processor element 234, and a memory element 236.

Transmitter section 230 is configured to generate, process, and transmit different data and signals associated with the operation of modem system 200. FIG. 2 depicts a number of blocks related to different data, signals, or sequences that may be transmitted by transmitter section 230 during the operation of modem system 200. Although a practical system may process and transmit any amount of additional or alternative data, the particular embodiment described herein functions in cooperation with at least the following signals or sequences: an answer signal 238, capabilities exchange information 240, and a training sequence duration 242. These signals and sequences, and the handling thereof by modem system 200, are described in detail below.

Receiver section 232 is configured to receive communication signals from modem 202; such signals may include encoded information bits, control signals, information exchange sequences, training sequences, and the like. Receiver section 232 may generate any number of outputs 243, e.g., control signals, information signals, or data signals, as required during the operation of modem system 200. In addition, receiver section 232 may be capable of receiving a line probing signal from modem 202. In this respect, modem 204 may be configured to perform a line probe analysis 244 to determine one or more characteristics of channel 206 based on the received line probing signal. As depicted in FIG. 2, the line probe analysis 244 may be utilized by modem 204 to obtain training sequence duration 242 (in accordance with known techniques, line probe analysis 244 may also be performed to assist in the adaptive training of receiver section 232 and/or other elements of modem 204).

Different aspects of the present invention contribute to the reduction in conventional half-duplex modem startup times, e.g., the elimination or abbreviation of the V.8 procedure, the exchanging of capabilities information concurrently with the transmission of a conventional answer signal, and the dynamic determination of a suitable training sequence duration. In accordance with the preferred embodiment, the quick startup techniques are fully compatible with legacy modem systems, i.e., the modem system is capable of escaping to conventional startup procedures.

Figure 3:
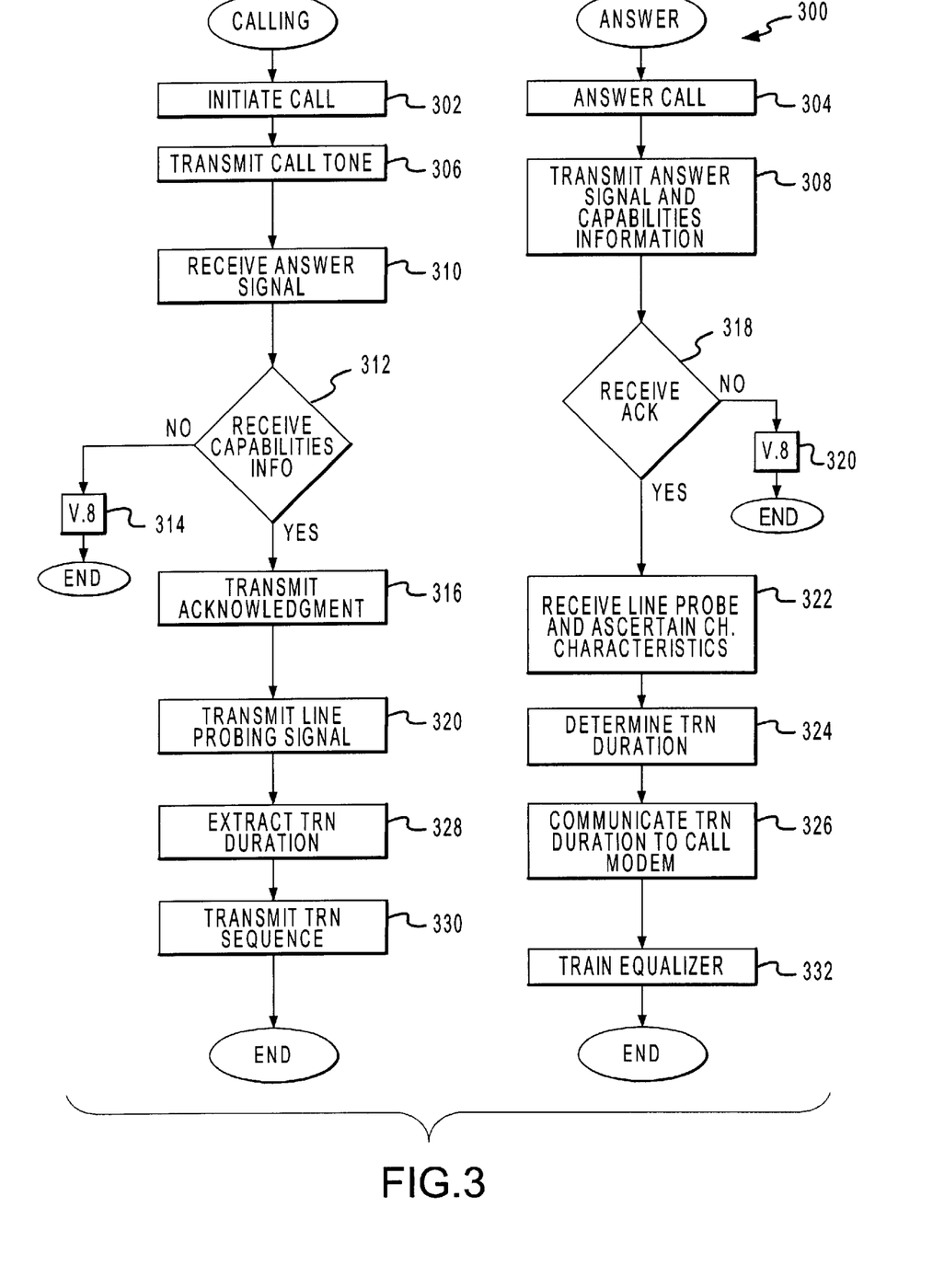
FIG. 3 is a flow diagram illustrating portions of a quick startup process that may be performed by two modem devices.
Figure 4:
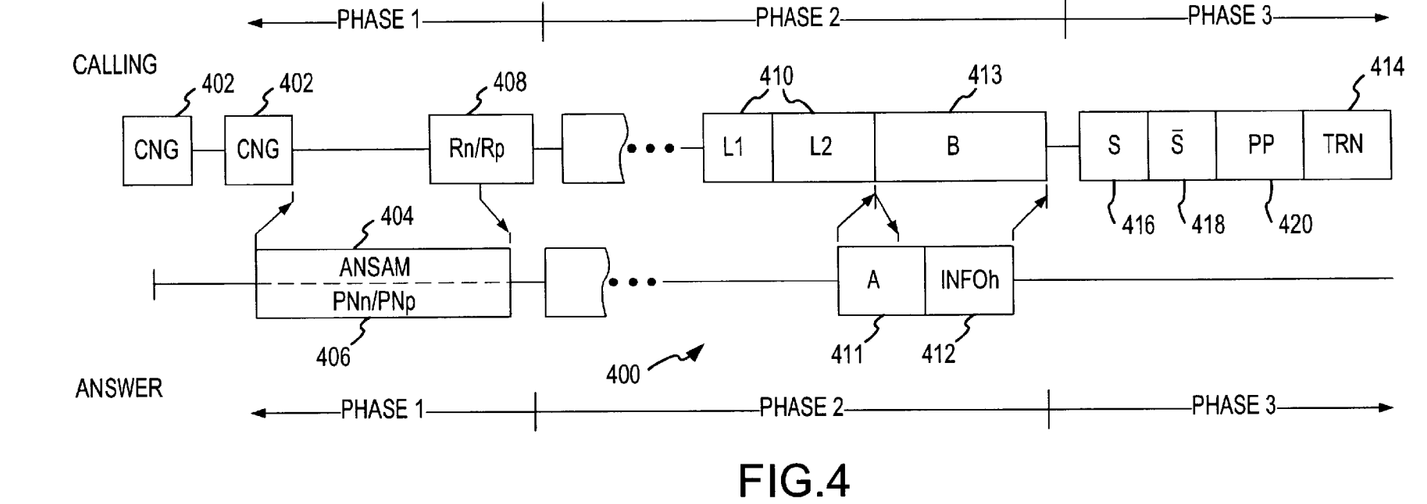
FIG. 4 is a timing diagram corresponding to a quick startup process that may be performed by two modem devices.

FIG. 3 is a flow diagram illustrating portions of a quick startup process 300 performed by two modem devices, and FIG. 4 is a timing diagram 400 corresponding to an illustrative quick startup process performed by two modem devices (modem system 200 may be configured to perform process 300). Timing diagram 400 includes acronyms and abbreviations that are often used in the context of V.8, V.34, V.90, and other data communication protocols. The use of such terminology herein is intended to illustrate the concepts of the present invention in the context of one practical embodiment. It should be appreciated that the present invention may be employed in any suitable context, and that the specific signals, number of sequences, timing of the sequences, interaction between the two modem devices shown in FIG. 4, and other features of the illustrative embodiment are not intended to limit the scope of the invention in any way.

Quick startup process 300 is depicted in a manner that indicates tasks associated with a calling modem and an answer modem. Similarly, timing diagram 400 shows the general sequencing of signals transmitted by a calling modem and an answer modem. In FIG. 4, the arrows between the two major sequences represent responses or interactions between the calling modem and the answer modem. Although process 300 may be implemented in any number of different system architectures, the description of process 300 refers to an example system that is consistent with modem system 200 (see FIG. 2). In addition, for the sake of brevity, process 300 is described herein in the context of a half-duplex system, i.e., the relevant data is transmitted from the calling modem to the answer modem. Although process 300 is preferably employed in a half-duplex facsimile modem system, the concepts of the present invention are not limited to any specific application.

Quick startup process 300 begins with a task 302, which causes the calling modem, e.g., modem 202, to initiate a call to the answer modem, e.g., modem 204. Task 302 may cause calling modem 202 to dial the telephone number assigned to answer modem 204, and the call may be established through local loop 108, central office 106, PSTN 110, central office 112, and local loop 114 (see FIG. 1). In response to an initial ring tone or other appropriate signal, answer modem 204 may answer the call in a conventional manner (task 304). After calling modem 202 has initiated the call, a task 306 may be performed if calling modem 202 is a facsimile modem. During task 306, calling modem 202 transmits a call tone that identifies the incoming call as a facsimile call. The call tone is represented by the CNG segments 402 shown in FIG. 4. In accordance with a practical embodiment, the CNG call tone segments 402 are analog burst tones formatted in accordance with ITU-T Recommendation T.30.

Assuming that answer modem 204 receives and correctly interprets the CNG call tone, then answer modem 204 will be informed that the incoming call will convey facsimile data. Consequently, answer modem 204 may perform a task 308 to transmit an answer signal to calling modem 202. As depicted in FIG. 2, answer modem 204 may transmit answer signal 238 via transmitter section 230. Assuming that answer modem 204 has the quick startup feature enabled, it may also transmit capabilities exchange information during task 308. As described above, answer modem 204 may transmit a suitable capabilities exchange signal 240 via transmitter section 230. In the preferred embodiment, at least a portion of the answer signal and at least a portion of the capabilities information are transmitted concurrently during a common time period. In FIG. 4, the answer signal is represented by the ANSam segment 404 and the capabilities exchange information is represented by the PNn/PNp segment 406. Both of these segments are shown in a single block to depict the concurrent nature of their transmission.

ANSam segment 404 may be formatted and configured in accordance with the well known ITU-T Recommendation V.8 (International Telecommunication Union, February 1998), the content of which is incorporated by reference herein. Briefly, the V.8 ANSam signal is an analog 2100 Hz tone that is modulated by a 15 Hz signal. In accordance with the conventional V.8 protocol, an ANSam signal is utilized to prompt a conventional calling modem to transmit a call menu (CM) signal. In contrast, modem system 200 need not transmit a CM signal unless the quick startup technique is not fully supported.

The transmission of PNn/PNp signal 406 need not be synchronized with the transmission of ANSam signal 404. For example, PNn/PNp signal 406 may be transmitted in response to the detection of a CNG segment 402, a predetermined time period after ANSam signal 404 begins, or a predetermined time period after answer modem 204 answers the incoming call. If PNn/PNp signal 406 is only transmitted in response to a CNG tone 402, then PNn/PNp signal 406 will not be sent unless the current call is a facsimile call. Consequently, only ANSam signal 404 would be transmitted for non-facsimile calls.

In accordance with the present invention, answer modem 204 transmits PNn/PNp segment 406 in a manner that does not interfere with the normal transmission or reception of ANSam signal 404. In addition, PNn/PNp signal 404 is preferably formatted to be distinguishable from startup signals used by other data transmission systems. To facilitate concurrent transmission (or at least partially concurrent transmission) with ANSam signal 404, PNn/PNp signal 406 is suitably configured as an analog signal that is modulated according to a different technique than ANSam signal 404. The different modulation techniques enable calling modem 202 to distinguish the two signals. In addition, the average transmit power level of PNn/PNp signal 406 is lower than the average transmit power level of ANSam signal 404 such that PNn/PNp signal 406 appears as noise to calling modems that are not conditioned to receive the PNn/PNp signal 406. In a practical embodiment, the average transmit power level of PNn/PNp signal 406 is at least 12 dB below the average transmit power level of ANSam signal 404.

In the example system described herein, PNn/PNp signal 406 is utilized to convey the capabilities exchange information that is normally transmitted during the conventional V.8 procedure. In the context of a half-duplex facsimile modem system, the amount of capabilities information exchanged may be abbreviated or limited to initial polling information, where a PNn signal indicates that the initial polling feature is not enabled and a PNp signal indicates that the initial polling feature is enabled. Briefly, the initial polling feature allows a calling modem to specify whether it will transmit or receive a facsimile. If initial polling is not fully enabled, then the calling modem can only transmit facsimiles. The details of initial polling are set forth in Recommendation T.30.

In accordance with one practical embodiment, a first signal (such as the PNp signal) is sent during task 308 when the initial polling capability is enabled and a second signal (such as the PNn signal) is sent when the initial polling capability is not enabled. The PNn and PNp signals are suitably formatted such that calling modem 202 can distinguish between the two. In accordance with one embodiment, the PNn signal is configured as a scrambled first sequence of digital data that is modulated according to a predetermined modulation scheme and the PNp signal is configured as a scrambled second sequence of digital data that is modulated according to the same predetermined modulation scheme. If the quick startup technique is supported by calling modem 202, then the modulation scheme and the particular configuration of the PNn and PNp signals are known.

One example of a suitable PNn signal is based on the following repetitive sequence of digital data: 100010001000 . . . 1000. This sequence is preferably scrambled in accordance with a predetermined scrambling algorithm, e.g., the answer mode scrambler set forth in ITU-T Recommendation V.32 (International Telecommunication Union, March 1993). The content of Recommendation V.32 is incorporated by reference herein. The scrambled sequence is thereafter modulated at 800 baud using the four-point V.32 constellation with differential encoding on a 2 kHz carrier at a level of approximately 18 dB below ANSam signal 404. In contrast, one example of a suitable PNp signal is based on a repetitive sequence of all zeros. The modulation and encoding scheme for the PNp signal is preferably as described above for the PNn signal. The spectrum of PNn/PNp signal 406 is substantially flat and between approximately 1.6 kHz and approximately 2.4 kHz. The PNn and PNp signals may be suitably selected such that they are easy to detect and easily distinguishable from each other. Of course, any number of alternate modulation schemes, constellations, and encoding techniques may be employed for purposes of PNn/PNp signal 406.

The capabilities exchange information may include, be configured as, or additionally function as a fast connect identifier that functions to inform calling modem 202 that the quick startup features of the present invention are enabled by answer modem 204. Thus, if calling modem 202 does not have the quick startup features enabled, then the initialization routine can quickly escape to a conventional mode.

Referring again to FIG. 3, calling modem 202 is suitably conditioned to receive ANSam signal 404 during a task 310. As described above, the transmission, detection, and processing of ANSam signal 404 may be performed in accordance with conventional techniques. Calling modem 202 may also be conditioned to concurrently receive PNn/PNp signal 406. Accordingly, in addition to task 310, quick startup process 300 may include a query task 312, which enables calling modem 202 to determine whether a PNn signal or a PNp signal is received. As described above, if the calling modem has the quick startup technique enabled, then it is capable of receiving and interpreting PNn/PNp signal 406. If query task 312 determines that PNn/PNp signal 406 is not received, then process 300 may escape to the conventional V.8 procedure (task 314). Thus, in accordance with the V.8 protocol, calling modem 202 would transmit a CM signal in response to ANSam signal 404.

If query task 312 determines that calling modem 202 has received PNn/PNp signal 406, then it may transmit a suitable acknowledgment signal to the answer modem (task 316). As shown in FIG. 2, acknowledgment signal 218 may be suitably transmitted by transmitter section 210. The acknowledgment signal functions to inform answer modem 204 that the quick startup routine is enabled and that the conventional V.8 process need not be performed. In accordance with the exemplary embodiment described herein, the acknowledgment signal is also configured to convey capabilities exchange information to answer modem 204. Consistent with this example system, the acknowledgment signal may convey initial polling information. The acknowledgment signal is represented by the Rn/Rp signal 408 in FIG. 4. In this context, an Rn signal is transmitted if initial polling is not enabled at calling modem 202 and an Rp signal is transmitted if initial polling is enabled at calling modem 202.

The Rn/Rp signal 408 is preferably formatted such that it is distinguishable from startup signals utilized by conventional data communication systems. For example, Rn/Rp signal 408 should be distinguishable from a conventional V.8 CM signal (which is typically transmitted in response to an ANSam signal). This feature allows quick startup process 300 to exit into a conventional V.8 mode if the quick startup technique is not fully supported by the modem system.

The Rn/Rp signal 408 is generally based on a sequence of digital data that is modulated in accordance with a predetermined scheme. One suitable example of an Rn signal is based on the following repetitive digital pattern: 110110110 . . . 110. The Rn signal is generated as a differential phase shift keying (DPSK) signal modulated at a data rate of 600 bps on a 1.2 kHz carrier for a fixed period of about 80 ms. An example of an Rp signal is based on the following repetitive digital pattern: 001001001 . . . 001. The same modulation scheme used for the Rn signal is used for the Rp signal. The Rn and Rp signals are preferably selected such that they are easy to detect and are easily distinguishable from conventional startup signals and from each other.

In response to its transmission of PNn/PNp signal 406, answer modem 204 is conditioned to receive Rn/Rp signal 408. If answer modem 204 does not detect Rn/Rp signal 408 (query task 318), then quick startup process 300 may escape to a conventional initialization procedure, e.g., the V.8 procedure (task 320). If query task 318 determines that the Rn/Rp acknowledgment signal 408 has been received, then both modems have the quick startup technique enabled and the conventional V.8 capabilities exchange signals need not be transmitted.

The answer modem 204 may use any number of techniques to detect Rn/Rp signal 408 during query task 318. For example, the spectrum of the illustrative Rn signal has content at 800 Hz, 1.0 kHz, 1.2 kHz, 1.4 kHz, and 1.6 kHz, and the spectrum of the illustrative Rp signal has content at 900 Hz, 1.1 kHz, 1.3 kHz, and 1.5 kHz. The particular spectral characteristics of Rn/Rp signal 408 makes it desirable to employ a background-running spectral energy detector during query task 318 rather than a conventional DPSK detector. Thus, if the spectral energy detector finds components at the relevant frequencies, then it may assume that an Rn or Rp signal has been received. This feature results in a reduced connection time without a corresponding sacrifice in performance.

As described above, if both modem devices support the quick startup technique, then the normal V.8 routine can be abbreviated or bypassed, thus reducing the startup latency relative to a conventional system. After PNn/PNp signal 406 and Rn/Rp signal 408 are exchanged, the modem system completes Phase 1 of the startup and enters Phase 2 to perform a line probing procedure. FIG. 3 and FIG. 4 illustrate the quick startup in the context of a system that does not have initial polling enabled (an illustrative process that contemplates initial polling is described below).

After the capabilities information is suitably exchanged by the two modem devices, calling modem 202 may perform a task 320. During task 320, calling modem 202 transmits a line probing signal to the answer modem. As described above in connection with FIG. 2, line probing signal 220 may be suitably transmitted by transmitter section 210. In FIG. 4, the line probing signal is represented by the L1/L2 signal 410. In a practical embodiment, L1/L2 signal 410 is formatted in accordance with Recommendation V.34. In response to the line probing signal, answer modem 204 receives an impaired or altered version of the line probing signal and ascertains characteristics of the communication channel by analyzing the received signal (task 322 ). Line probing techniques and the manner in which modem devices determine the characteristics of a channel are well known to those skilled in the art. Briefly, the specific format of the line probing signal may be known a priori by answer modem 204 to enable it to compare the received signal to the transmitted signal. The differences between the ideal signal and the received signal convey information related to the channel characteristics. In the preferred embodiment, one relevant channel characteristic is the signal-to-noise ratio (SNR) associated with the channel. Other channel characteristics that may be utilized in the context of the present invention include the signal-to-harmonic ratio, the noise change, the harmonic change, the signal slope, the noise slope, the frequency offset, or the like.

In FIG. 4, a signal 411 (the "A" signal) represents a signature handshaking tone that is transmitted by the answer modem to inform the calling modem that the line probing analysis is complete. Upon receipt of signal 411, the calling modem stops transmitting L1/L2 signal 410 and transmits a signal 413 (the "B" signal). Signal 413 may be a signature handshaking tone that informs the answer modem that the calling modem is no longer is transmitting the L1/L2 probing signal 410 and that the calling modem is ready for the next phase.

A task 324 may be performed by answer modem 204 to determine a time duration for a training sequence to be transmitted by calling modem 202 (described in more detail below). As mentioned above, the present invention is not limited to the determination, selection, and communication of a time duration for the training sequence. Indeed, although conventional modem systems may designate a time duration, the concepts of the present invention may be equivalently employed to determine, select, format, and transmit a training sequence having a specific symbol or codeword length. In the illustrative embodiment described herein, task 324 determines the training sequence duration in response to at least one ascertained characteristic of the channel (task 322). During task 324, the preferred embodiment may interrogate a database containing a plurality of signal-to-noise ratios and respective training sequence durations. Such a database may be a predetermined look-up table of previously determined empirical SNR values versus corresponding training sequence durations that are selected to ensure (or increase the likelihood) that the answer modem is adequately trained during the next training stage. For example, if the SNR is low, then it may be desirable to have a relatively long training sequence. Conversely, if the SNR is high, then a relatively short training sequence may suffice. With respect to this feature, modem 204 may utilize such a database in connection with the line probe analysis 244 to obtain a desirable training sequence duration 242.

The adaptive determination of a preferred training sequence duration enables the modem system to adjust the length of the Phase 3 training according to the current channel conditions. Thus, if the channel is relatively clean and a long train is not necessary, the startup latency can be reduced relative to a conventional system. This feature is desirable over conventional initialization routines that utilize a predetermined fixed training sequence duration that may be excessively long for certain connections. The present invention allows the modem system to be initially trained in an efficient amount of time such that the modem system can quickly commence the transmission of data.

After a preferred training sequence duration is determined during task 324, a task 326 is performed to communicate the preferred duration back to calling modem 202. As shown in FIG. 2, modem 204 employs transmitter section 230 to communicate training sequence duration 242 to modem 202. In the example embodiment described herein, the preferred training sequence duration may be conveyed to the calling modem via an information segment, e.g., an INFOh signal 412 (see FIG. 4). The information segment may include digital data, encoded data, or the like, in a format that can be received and interpreted by the calling modem. Indeed, any number of data communication techniques may be employed for purposes of task 326. As depicted in FIG. 4, the INFOh signal 412 is transmitted after the line probing signal has been received and after the line probing analysis has been completed.

After calling modem 202 receives the information segment bearing the training sequence duration, a task 328 may be performed such that calling modem 202 extracts the training sequence duration from the information segment. Task 328 may cause calling modem 202 to process and analyze the information segment to determine the preferred training sequence duration that was requested by answer modem 204. The calling modem may perform task 328 while it transmits or receives other startup signals. For example, in accordance with known techniques, the calling modem may transmit a signal 416 (the "S" signal), a signal 418 (the "S\" signal), and a signal 420 (the "PP" signal).

Signals 416 and 418 are utilized to synchronize the modem devices prior to the equalizer training. Signal 420 is a relatively short sequence associated with main channel equalizer training, i.e., coarse training of the answer modem equalizer structure.

Once the preferred training sequence duration is extracted, calling modem 202 transmits a suitable training sequence (which may be considered to be associated with a fine training or tuning of the equalizer structure) having the preferred training sequence duration to answer modem 204 (task 330). FIG. 2 also depicts that calling modem 202 is capable of receiving the training sequence duration 224, formatting the training sequence 222, and transmitting training sequence 222 with transmitter section 210. In this respect, the training sequence has a variable time duration that is dependent upon the channel characteristics ascertained during task 322. The variation of the training sequence time duration is "dynamic" in the sense that the preferred duration may be determined for each connection in response to the channel conditions rather than on the basis of predetermined and fixed parameters (e.g., the specific configuration of the modem devices).

The sending of the training sequence is performed during Phase 3 of the startup procedure. In the context of FIG. 4, the training sequence is represented by the TRN signal 414. In the preferred embodiment, TRN signal 414 is formatted and configured in accordance with the ITU-T Recommendation V.34. Briefly, TRN signal 414 may be configured as a repetitive sequence of symbols generated in response to a scrambled binary input that is mapped in accordance with a predetermined signal point constellation. The training sequence duration designated by answer modem 204 in task 326 may dictate how often the fundamental training sequence is repeated during task 330.

The training sequence is eventually received by answer modem 204 (in a practical system, the original training sequence will likely-be altered, modified, or impaired during transmission and answer modem 204 rarely receives the same sequence). Answer modem 204 processes the received training sequence and adaptively adjusts one or more of its functional parameters to compensate for the imperfect channel characteristics. For example, answer modem 204 may train an equalizer structure in response to the received training sequence (task 332). Although not shown in FIG. 2, the equalizer structure may be implemented in (or be operatively associated with) receiver section 232. The quality of the initial training performed during task 332 depends in part on the length of the training sequence. Consequently, in a practical embodiment, the training sequence duration requested by answer modem 204 should be sufficient to enable answer modem 204 to efficiently complete the Phase 3 training. Thus, a preferred practical embodiment strikes a balance between the need for adequate initial training and the desire to reduce the overall startup time.

Following task 332, quick startup process 300 ends. Of course, any number of conventional startup tasks may follow task 332 or be interlaced between the tasks shown in FIG. 3. Once the initialization of the modem system is complete, the system may proceed with the data mode. In a typical application, the techniques described herein may reduce the startup time normally associated with a conventional half-duplex facsimile system by up to 50%. For example, the elimination of the conventional V.8 procedure may reduce the startup time by up to one second. For a relatively clean channel, the Phase 3 training may be shortened from approximately three seconds to less than a half second. For a relatively noisy channel, the Phase 3 training may be shortened from approximately five seconds to approximately three seconds. It should be appreciated that the actual reduction in startup. time may be implementation and/or application specific.

Figure 5:
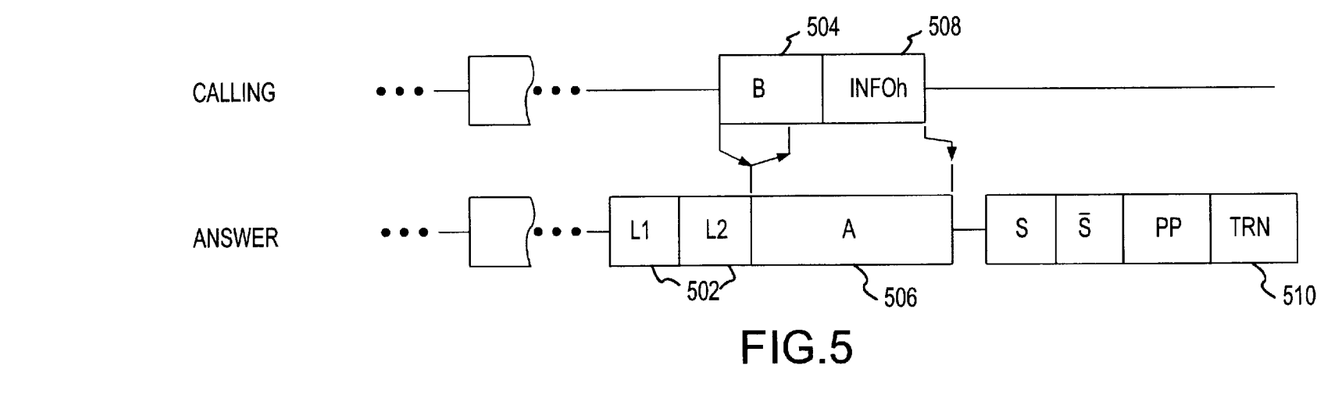
FIG. 5 is a timing diagram corresponding to a portion of a quick startup process that includes an initial polling procedure.

FIG. 5 is an illustrative timing diagram 500 associated with a quick startup process for two modem devices that have initial polling enabled. As described above, initial polling is a feature that enables the calling modem to receive facsimile data from the answer modem. The process tasks associated with such an initial polling mode are similar to those described above in connection with FIG. 3. In addition, the specific signals and sequences shown in FIG. 5 may be similar to those shown in FIG. 3; the above description of such signals and sequences applies in an equivalent manner.

In a practical embodiment, the Phase 1 portion of the quick startup procedure may be the same whether or not initial polling is to be enabled. Accordingly, FIG. 5 differs from FIG. 4 with respect to the Phase 2 and Phase 3 portions. Assuming that the modem devices have confirmed that initial polling is to be enabled (i.e., the answer modem has transmitted a PNp signal and the calling modem has transmitted an Rp signal), the answer modem will eventually transmit a suitable line probing signal 502 (the "L1/L2" signal) to the calling modem. Once the calling modem has completed its line probing analysis, it may transmit a suitable signal 504 (the "B" signal) to the answer modem. In turn, the answer modem transmits a signal 506 (the "A" signal) to inform the calling modem that the answer modem has finished sending the line probing signal 502 and that the calling modem is ready for the next phase.

In response to the line probing analysis, the calling modem selects a desired training sequence duration associated with the final training sequence (as described above). The desired training sequence duration is communicated back to the answer modem in a suitable manner, e.g., via an exchange signal 508 (the "INFOh" signal). Eventually, the answer modem extracts the training sequence duration information form the received exchange signal 508 and formats a training sequence 510 (the "TRN" sequence) for transmission during Phase 3. The synchronization signals ("S" and "S\") and the initial training signal ("PP") function as described above in connection with FIG. 4. In this manner, the quick startup techniques may be implemented in a system, regardless of whether initial polling is utilized, to reduce the overall initialization time.

The present invention has been described above with reference to a preferred embodiment. However, those skilled in the art having read this disclosure will recognize that changes and modifications may be made to the preferred embodiment without departing from the scope of the present invention. These and other changes or modifications are intended to be included within the scope of the present invention, as expressed in the following claims.

What is claimed is:

1. A method for reducing startup latency associated with a data transmission system having a calling device configured to communicate with an answer device over a communication channel, said method comprising the steps of:

establishing a call between said calling device and said answer device;

transmitting an answer signal from said answer device to said calling device; and sending a capabilities exchange signal from said answer device to said calling device, said sending step being performed concurrently with said transmitting step.

2. A method according to claim 1, wherein said transmitting step transmits an analog answer tone.

3. A method according to claim 2, wherein said analog answer tone is configured as an ANSam tone as defined by the ITU-T Recommendation V.8.

4. A method according to claim 1, wherein:

said answer device is configured to transmit facsimile data; and said capabilities exchange signal comprises information associated with an initial polling capability of said answer device.

5. A method according to claim 4, wherein:

said sending step sends a first signal when said initial polling capability is enabled; and said sending step sends a second signal when said initial polling capability is not enabled, said second signal being distinguishable from said first signal by said calling device.

6. A method according to claim 5, wherein:

said first signal is configured as a scrambled first sequence of digital data that is modulated according to a modulation scheme; and said second signal is configured as a scrambled second sequence of digital data that is modulated according to said modulation scheme.

7. A method according to claim 1, wherein:

said answer signal has a first transmit power level; and said capabilities exchange signal has a second transmit power level lower than said first transmit power level.

8. A method according to claim 7, wherein said second average transmit power level is at least 12 decibels lower than said first transmit power level.

9. A method according to claim 1, further comprising the step of transmitting an acknowledgment signal, from said calling device to said answer device, in response to the receipt of said capabilities exchange signal by said calling device.

10. A method according to claim 8, further comprising the step of performing a line probing procedure in response to said acknowledgment signal.

11. A method according to claim 1, wherein said capabilities exchange signal is formatted to be distinguishable from startup signals used by other data transmission systems.

12. A method for reducing startup latency associated with a data transmission system having a calling device configured to communicate with an answer device over a communication channel, said method comprising the steps of:

establishing a call between said calling device and said answer device;

transmitting a line probing signal by said calling device to said answer device;

receiving a training sequence duration by said calling device from said answer device, wherein said training sequence duration is based on a characteristic of said communication channel derived by said answer device from said line probing signal; and sending a training sequence for said training sequence duration by said calling device to said answer device.

13. A method according to claim 12, further comprising the step of training an equalizer structure resident at said answer device, said training step being responsive to said training sequence.

14. A method according to claim 12, wherein said characteristic is a signal-to-noise ratio.

15. A method according to claim 12, further comprising the step of determining a training sequence duration in response to said characteristic, said determining step being performed by said answer device.

16. A method according to claim 15, wherein said determining step comprises the step of interrogating a database containing a plurality of signal-to-noise ratios and respective training sequence durations.

17. A method according to claim 16, further comprising the step of communicating said training sequence duration to said calling device, said communicating step being performed by said answer device prior to said sending step.

18. A data transmission device comprising:
    a transmitter section configured to transmit an answer signal in response to the establishment of a call with a remote device over a communication channel, and to transmit a quick connect identifier concurrently with said answer signal;
    a receiver section configured to receive a line probing signal transmitted by said remote device; and
    a processor element configured to ascertain a characteristic of said communication channel in response to said line probing signal and to determine a training sequence duration in response to said characteristic.

19. A data transmission device according to claim 18, wherein said quick connect identifier is further configured to convey capabilities exchange information to said remote device.

20. A data transmission device according to claim 19, wherein said transmitter section is configured to transmit facsimile data; and
    said capabilities exchange information is associated with an initial polling capability of said data transmission device.

21. A data transmission device according to claim 18, wherein:
    said answer signal has a first transmit power level; and
    said quick connect identifier has a second transmit power level at least 12 decibels lower than said first transmit power level.

22. A data transmission device according to claim 18, wherein said transmitter section is further configured to communicate said training sequence duration to said remote device.

23. A data transmission device according to claim 18, wherein said characteristic is a signal-to-noise ratio.

24. A data transmission device according to claim 23, wherein said processor is further configured to interrogate a database containing a plurality of signal-to-noise ratios and respective training sequence durations.

25. A method for reducing startup latency associated with establishing a data communication session between a first communication device and a second communication device over a communication channel, said method comprising:
    calling said second communication device by said first communication device;
    receiving an answer signal by said first communication device from said second communication device in response to said calling; and
    receiving a capabilities signal by said first communication device from said second communication device in response to said calling, wherein at least a portion of said capabilities signal is received concurrently with said receiving said answer signal.

26. The method of claim 25, wherein said answer signal is amplitude modulated and said capabilities signal is modulated according to a different technique than said answer signal.

27. The method of claim 25, wherein said capabilities signal is a PNn signal.

28. The method of claim 25, wherein said capabilities signal is a PNp signal.

29. The method of claim 25, wherein an average transmit level of said capabilities signal is below an average transmit level of said answer signal.

30. The method of claim 25 further comprising: transmitting an acknowledgement signal by said first communication device to said second communication device in response to said receiving said capabilities signal.

31. The method of claim 30, wherein said acknowledgement signal includes capabilities of said first communication device.

32. The method of claim 30 further comprising:
    transmitting a line probing signal by said first communication device to said second communication device; and
    receiving a training sequence duration by said first communication device from said second communication device, wherein said training sequence duration is based on a characteristic of said communication channel derived by said second communication device from said line probing signal.

33. The method of claim 32 further comprising: sending a training sequence for said training sequence duration by said first communication device to said second communication device.

34. A method for reducing startup latency associated with establishing a data communication session between a first communication device and a second communication device over a communication channel, said method comprising:
    receiving a call by said first communication device from said second communication device;
    transmitting an answer signal by said first communication device to said second communication device in response to said call; and
    transmitting a capabilities signal by said first communication device to said second communication device in response to said call, wherein at least a portion of said capabilities signal is transmitted concurrently with said transmitting said answer signal.

35. The method of claim 34, wherein said answer signal is amplitude modulated and said capabilities signal is modulated according to a different technique than said answer signal.

36. The method of claim 34, wherein said capabilities signal is a PNn signal.

37. The method of claim 34, wherein said capabilities signal is a PNp signal.

38. The method of claim 34, wherein an average transmit level of said capabilities signal is below an average transmit level of said answer signal.

39. The method of claim 34 further comprising: receiving an acknowledgement signal by said first communication device from said second communication device in response to said transmitting said capabilities signal.

40. The method of claim 39, wherein said acknowledgement signal includes capabilities of said second communication device.

41. The method of claim 39 further comprising:
    receiving a line probing signal by said first communication device from said second communication device;
    deriving a characteristic of said communication channel by said first communication device from said line probing signal;

determining a training sequence duration by said first communication device based on said characteristic of said communication channel; and transmitting said training sequence duration by said first communication device to said second communication device.

42. The method of claim 41 further comprising: receiving a training sequence for said training sequence duration by said first communication device from said second communication device.

43. A communication device capable of reducing startup latency associated with establishing a data communication session with a remote device over a communication channel, said communication device comprising:

a processor capable of processing a call from said remote device; and a transmitter capable of transmitting an answer signal to said remote device in response to said call, and said transmitter further capable of transmitting a capabilities signal to said remote device in response to said call, wherein said processor causes said transmitter to transmit at least a portion of said capabilities signal concurrently with transmitting said answer signal.

44. The communication device of claim 43, wherein said answer signal is amplitude modulated and said capabilities signal is modulated according to a different technique than said answer signal.

45. The communication device of claim 43, wherein said capabilities signal is a PNn signal.

46. The communication device of claim 43, wherein said capabilities signal is a PNp signal.

47. The communication device of claim 43, wherein an average transmit level of said capabilities signal is below an average transmit level of said answer signal.

48. The communication device of claim 43 further comprising: a receiver capable of receiving an acknowledgement signal from said remote device in response to said capabilities signal.

49. The communication device of claim 48, wherein said acknowledgement signal includes capabilities of said remote device.

50. The communication device of claim 48, wherein said receiver receives a line probing signal from said remote device, said processor derives a characteristic of said communication channel from said line probing signal and determines a training sequence duration based on said characteristic of said communication channel, and said transmitter transmits said training sequence duration to said remote device.

51. The communication device of claim 50, wherein said receiver receives a training sequence for said training sequence duration from said remote device.

52. A method for reducing startup latency associated with establishing a data communication session between a first communication device and a second communication device over a communication channel, said method comprising:

receiving a line probing signal by said first communication device from said second communication device;

deriving a characteristic of said communication channel by said first communication device from said line probing signal;

determining a training sequence duration by said first communication device based on said characteristic of said communication channel; and transmitting said training sequence duration by said first communication device to said second communication device.

53. The method of claim 52 further comprising: receiving a training sequence for said training sequence duration by said first communication device from said second communication device.

54. The method of claim 52, wherein said characteristic is signal-to-noise ratio.

55. A communication device capable of reducing startup latency associated with establishing a data communication session with a remote device over a communication channel, said method comprising:

a receiver capable of receiving a line probing signal from said remote device;

a processor capable of deriving a characteristic of said communication channel from said line probing signal and determining a training sequence duration based on said characteristic of said communication channel; and a transmitter capable of transmitting said training sequence duration to said remote device.

56. The communication device of claim 55, wherein said receiver receives a training sequence for said training sequence duration from said remote device.

57. The communication device of claim 55, wherein said characteristic is signal-to-noise ratio.

* * * * *